US010427559B2

(12) United States Patent
Anderson et al.

(10) Patent No.: US 10,427,559 B2
(45) Date of Patent: Oct. 1, 2019

(54) CHILD RESTRAINT SYSTEM WITH SEAT-ORIENTATION ADJUSTER

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/727,115

(22) Filed: Oct. 6, 2017

(65) Prior Publication Data

US 2018/0099588 A1    Apr. 12, 2018

Related U.S. Application Data

(60) Provisional application No. 62/405,386, filed on Oct. 7, 2016.

(51) Int. Cl.
*B60N 2/28* (2006.01)

(52) U.S. Cl.
CPC ......... *B60N 2/2857* (2013.01); *B60N 2/2806* (2013.01); *B60N 2/286* (2013.01); *B60N 2/2821* (2013.01); *B60N 2/2845* (2013.01); *B60N 2/2863* (2013.01); *B60N 2/2866* (2013.01)

(58) Field of Classification Search
CPC .. B60N 2/2857; B60N 2/2806; B60N 2/2821; B60N 2/2866; B60N 2/28

USPC ................. 297/250.1, 256.1, 256.13, 256.16
See application file for complete search history.

(56) References Cited

U.S. PATENT DOCUMENTS

| | | | |
|---|---|---|---|
| 3,649,074 A | 3/1972 | McDonald et al. | |
| 4,911,499 A | 3/1990 | Meeker | |
| 6,454,350 B1 | 9/2002 | Celestina-Krevh et al. | |
| 6,554,358 B2 | 4/2003 | Kain | |
| 6,746,080 B2 | 6/2004 | Tsugimatsu et al. | |
| 7,059,677 B2 | 6/2006 | Balensiefer et al. | |
| 7,246,855 B2 | 7/2007 | Langmaid et al. | |
| 7,735,921 B2 | 6/2010 | Hutchinson et al. | |
| 7,819,472 B2 | 10/2010 | Hutchinson et al. | |
| 8,123,295 B2 | 2/2012 | Hutchinson et al. | |
| 8,186,757 B2 * | 5/2012 | Duncan ............... | B60N 2/2806 297/256.13 |
| 8,317,265 B2 | 11/2012 | Hutchinson et al. | |
| 8,474,907 B2 | 7/2013 | Weber et al. | |
| 8,556,344 B2 | 10/2013 | Williams et al. | |
| 8,585,143 B2 | 11/2013 | Xiao | |
| 8,870,285 B2 | 10/2014 | Williams et al. | |
| 8,998,318 B2 | 4/2015 | Gaudreau, Jr. | |
| 9,085,250 B2 | 7/2015 | Cheng et al. | |
| 2012/0280540 A1 * | 11/2012 | Pedraza ............... | B60N 2/2806 297/148 |
| 2014/0232152 A1 | 8/2014 | Minato et al. | |
| 2014/0252829 A1 * | 9/2014 | Williams ............. | B60N 2/2842 297/256.16 |
| 2016/0207497 A1 * | 7/2016 | Seal ..................... | B60R 22/105 |

* cited by examiner

*Primary Examiner* — Mark R Wendell
(74) *Attorney, Agent, or Firm* — Barnes & Thornburg LLP

(57) ABSTRACT

A child restraint includes a seat-support base adapted to be retained on a vehicle passenger seat. The child restraint also includes a juvenile seat mounted on the seat-support base and sized to seat a juvenile.

9 Claims, 8 Drawing Sheets

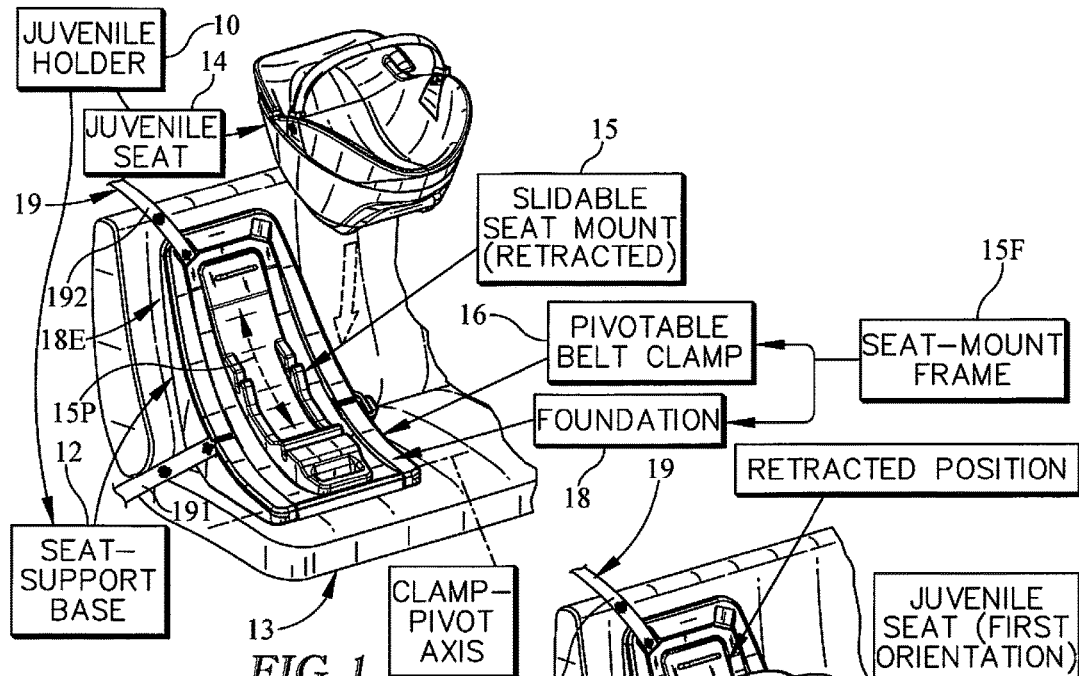
FIG. 1
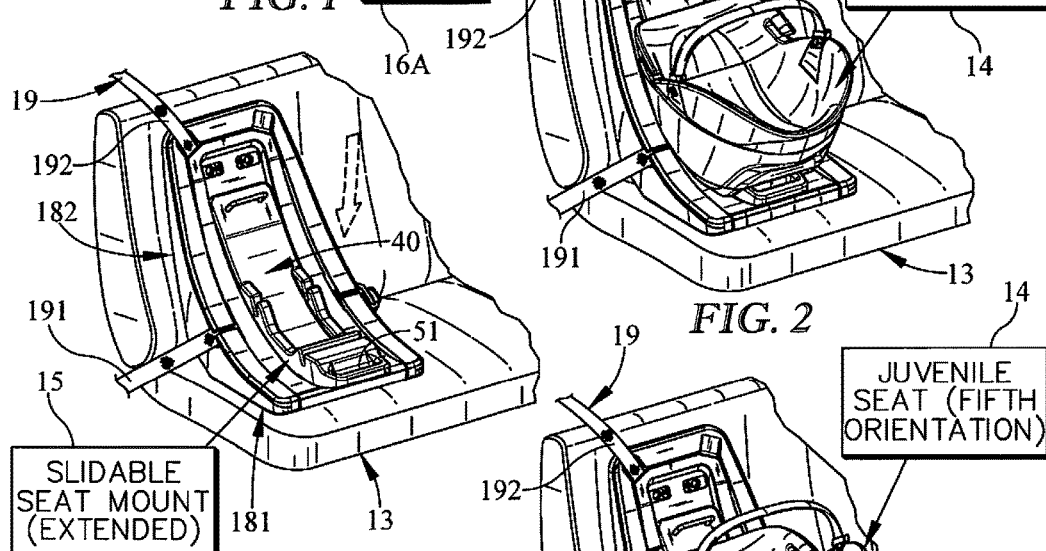
FIG. 2
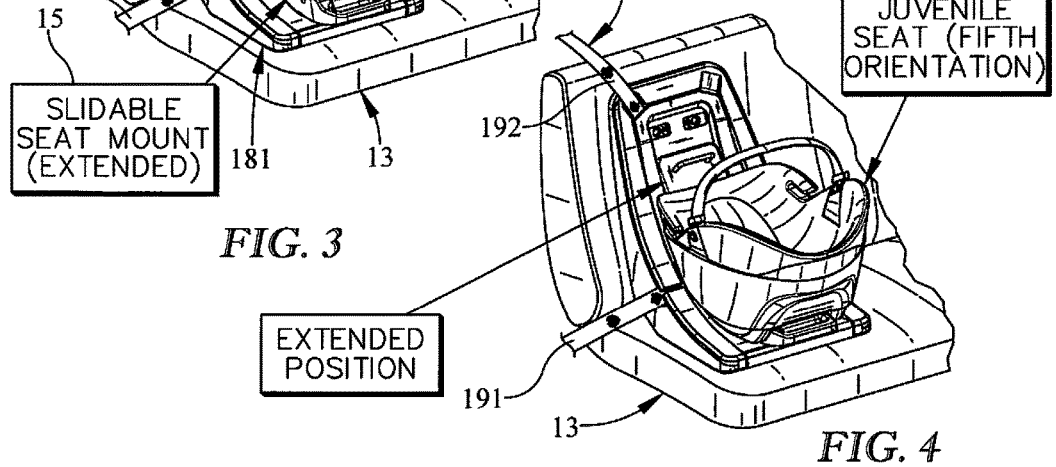
FIG. 3
FIG. 4

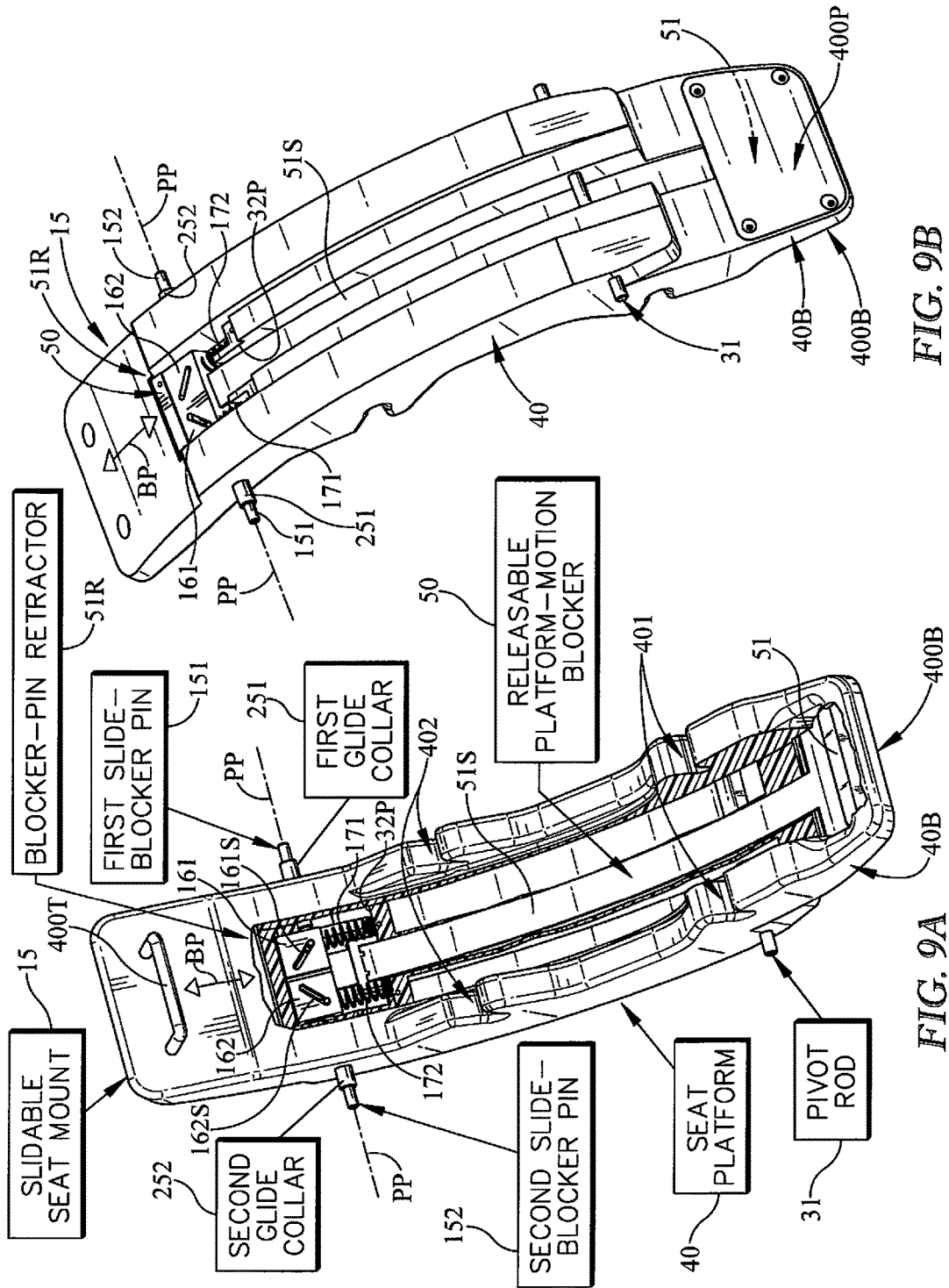

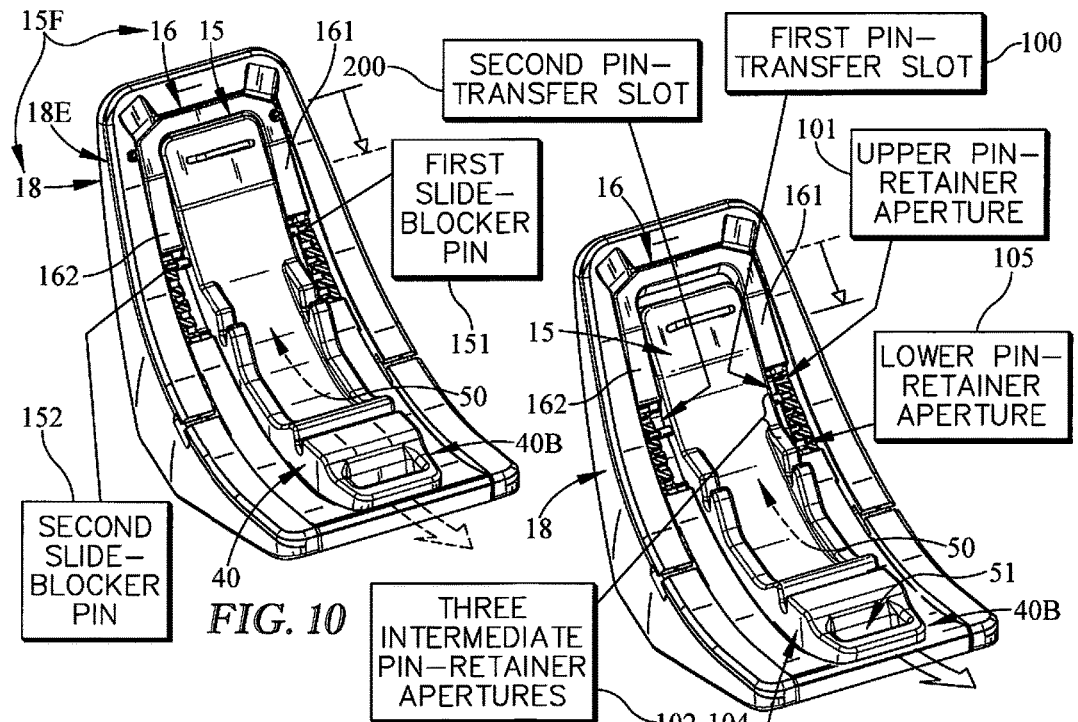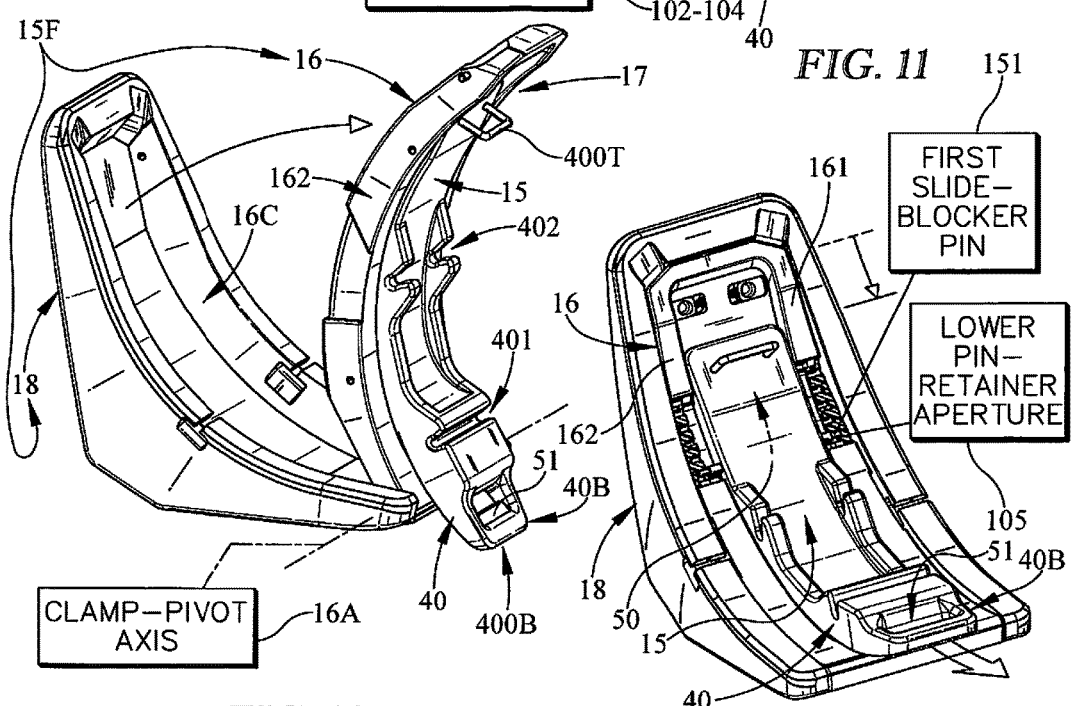

CHILD RESTRAINT SYSTEM WITH SEAT-ORIENTATION ADJUSTER

PRIORITY CLAIM

This application claims priority under 35 U.S.C. § 119(e) to U.S. Provisional Application No. 62/405,386 filed Oct. 7, 2016, which is expressly incorporated by reference herein.

BACKGROUND

The present disclosure relates to child restraints, and particularly to child restraints for use on passenger seats in vehicles. More particularly, the present disclosure relates to a child restraint including a juvenile seat and a seat support held in place on an underlying passenger seat by a passenger seat belt.

SUMMARY

A child restraint in accordance with the present disclosure includes a juvenile holder configured to hold a young child or infant. In illustrative embodiments, the juvenile holder includes a seat-support base adapted to set on a passenger seat in a vehicle and a juvenile seat configured to be mounted on the seat-support base after the seat-support base is anchored to the passenger seat using a vehicle seat belt associated with the passenger seat.

In illustrative embodiments, the seat-support base can remain in the anchored stationary position on the passenger seat. A caregiver can mount a juvenile seat on the seat-support base when it is desired to transport a young child or infant in the vehicle. In accordance with the present disclosure, the juvenile seat can be an infant carrier or a seat sized to carry an older child.

In illustrative embodiments, the seat-support base includes a foundation that is adapted to set on the passenger seat, a pivotable belt clamp arranged to pivot relative to the foundation about a forward clamp-pivot axis, and a seat mount coupled to the pivotable belt clamp to pivot with the belt clamp. The seat mount is configured to mate with the overlying juvenile seat. The foundation and the pivotable belt clamp cooperate to define a seat-mount frame to provide a stationary footing for the seat mount.

In illustrative embodiments, the seat mount is a seat-position and seat-orientation controller that is arranged to slide up and down on the pivotable belt clamp of the seat-mount frame under the control of a caregiver to change the position and orientation of the juvenile seat relative to the seat-mount frame. After the slidable seat mount has been slid by a caregiver upwardly in a first direction to a RAISED-AND-RETRACTED position on the pivotable belt clamp, a juvenile seat coupled to the slidable seat mount is retained in a first orientation relative to the seat-mount frame of the seat-support base. Alternatively, after the slidable seat mount has been slid downwardly by a caregiver in an opposite second direction to a LOWERED-AND-EXTENDED position on the pivotable belt clamp, the juvenile seat is retained in a different second orientation relative to the seat-mount frame of the seat-support base. In illustrative embodiments, three INTERMEDIATE positions are provided between the RAISED-AND-RETRACTED and LOWERED-AND-EXTENDED positions so that caregiver can select one of five possible orientations for the juvenile seat.

In illustrative embodiments, the pivotable belt clamp can be pivoted forwardly by a seat installer about a forward clamp-pivot axis away from the foundation to an OPENED BELT-RECEIVING position to expose an upwardly opening belt-receiver cavity formed in the foundation of the seat-mount frame. The seat installer can then place portions of shoulder and lap straps included in the vehicle seat belt in the exposed upwardly opening belt-receiver cavity. Then the seat installer can pivot the belt clamp rearwardly toward the foundation to a CLOSED BELT-TRAPPING position to trap the seat belt portions placed in the belt-receiver cavity and tension the shoulder and lap straps included in the vehicle seat belt so that the seat-mount frame of the seat-support base is anchored in a stationary position on the passenger seat. When the pivotable belt clamp is pivoted to the CLOSED BELT-TRAPPING position, the slidable seat mount that is coupled to the pivotable belt clamp is oriented in a suitable position to engage and support the juvenile seat in a stationary position and orientation relative to the seat-mount frame of the seat-support base. The caregiver can slide the seat mount up and down along a concave curved path provided on the pivotable belt clamp to change the position and orientation of the juvenile seat that is mated with the slidable seat mount to achieve one of the five available seat orientations while the seat-mount frame remains anchored to the passenger seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 1 is a perspective view of a seat-support base included in a child restraint in accordance with the present disclosure along with a perspective view of a juvenile seat that is adapted to be mounted on the seat-support base and showing the seat-support base comprises a seat-mount frame including a foundation and a pivotable belt clamp that can pivot relative to the foundation about a clamp-pivot axis and showing that the seat-support base further comprises a slidable seat mount that is coupled to the pivotable belt clamp of the seat-mount frame to pivot with the pivotable belt clamp and that can mate with the juvenile seat and also showing the seat-mount frame at rest on a vehicle passenger seat after the seat belt has been mated to the foundation by trapping portions of the seat belt between the foundation and the pivotable belt clamp to hold the seat-mount frame in a stationary position on the vehicle passenger seat and before the juvenile seat has been mounted on the slidable seat mount of the seat-support base and suggesting that the juvenile seat is a rearwardly facing infant carrier and suggesting that the slidable seat mount is configured to mate with the underside of the juvenile seat and move at the option of a caregiver along a curved path and relative to the underlying pivotable belt clamp of the seat-mount frame from a RAISED-AND-RETRACTED position shown in FIGS. 1 and 2 to a LOWERED-AND-EXTENDED position shown in FIGS. 3 and 4 to change the position and orientation of a juvenile seat coupled to the slidable seat mount;

FIG. 2 is a view similar to FIG. 1 showing that the juvenile seat is mated to the slidable seat mount of the seat-support base to assume a first seat orientation when the slidable seat mount is retained in the RAISED-AND-RETRACTED position relative to a seat-mount frame comprising the pivotable belt clamp and the foundation;

FIG. 3 is a view similar to FIG. 1 showing that the slidable seat mount has been moved relative to a seat-mount frame comprising the pivotable belt clamp and the foundation in a forward direction to a LOWERED-AND-EXTENDED position;

FIG. 4 is a view similar to FIG. 3 showing that the juvenile seat is mated to the slidable seat mount of the seat-support base to assume a different (e.g. fifth) seat orientation when the slidable seat mount is retained in the LOWERED-AND-EXTENDED position relative to a seat-mount frame comprising the pivotable belt clamp and the foundation;

FIG. 9A is a top perspective view of the slidable seat mount with portions broken away to show the releasable platform-motion blocker after it is mounted in some cavities and slots formed in the movable seat platform and showing how the first slide-blocker pin is arranged to extend through a passageway formed in a companion stationary first collar and biased outwardly in a first direction to assume a LATERALLY EXTENDED position and also showing how the second slide-blocker pin is arranged to extend through a passageway formed in a companion stationary second glide collar and biased outwardly in an opposite second direction to assume a LATERALLY EXTENDED position;

FIG. 9B is a bottom perspective view of the slidable seat mount of FIG. 9A showing visible portions of the releasable platform-motion blocker and the pivot rod;

FIG. 10 is a perspective view of the seat-support base of FIG. 1, with portions broken away to show the positions of the first and second slide-blocker pins included in the slidable seat mount and arranged to extend in opposite directions into companion upper pin-retainer apertures formed in the pivotable belt clamp to block sliding movement of the slidable seat mount on the pivotable belt clamp and retain the slidable seat mount in the RAISED-AND-RETRACTED position on the pivotable belt clamp of the seat-mount frame;

FIG. 11 is a perspective view similar to FIG. 10, with portions broken away to show placement of each of the first and second slide-blocker pins in a companion first intermediate pin-retainer aperture after (1) withdrawal of each slide-blocker pin from its companion upper pin-retainer aperture to free the slidable seat mount to slide toward its LOWERED-AND-EXTENDED position downwarding along curved path on the stationary pivotable belt clamp of the seat-mount frame and (2) downward movement of each slide-blocker pin in its companion pin-transfer slot to reach and then extend into the companion first intermediate pin-retainer aperture communication with such pin-transfer slot and showing that each interior side portion of the pivotable belt clamp is formed to include a vertically extending pin-transfer slot and a series of five horizontally extending pin-retainer apertures (e.g. an upper pin-retainer aperture, three intermediate pin-retainer apertures, and a lower pin-retainer aperture);

FIG. 12 is a perspective view similar to FIG. 11, with portions broken away to show the first and second slide-blocker pins extended in to companion lower pin-retainer apertures formed in the pivotable belt clamp to retain the slidable seat mount in the LOWERED-AND-EXTENDED position on the pivotable belt clamp of the seat-mount frame;

FIG. 13 is a view similar to FIG. 11 showing pivotable movement of the pivotable belt clamp about a forward clamp-pivot axis relative to the foundation;

DETAILED DESCRIPTION

Figure 5A:
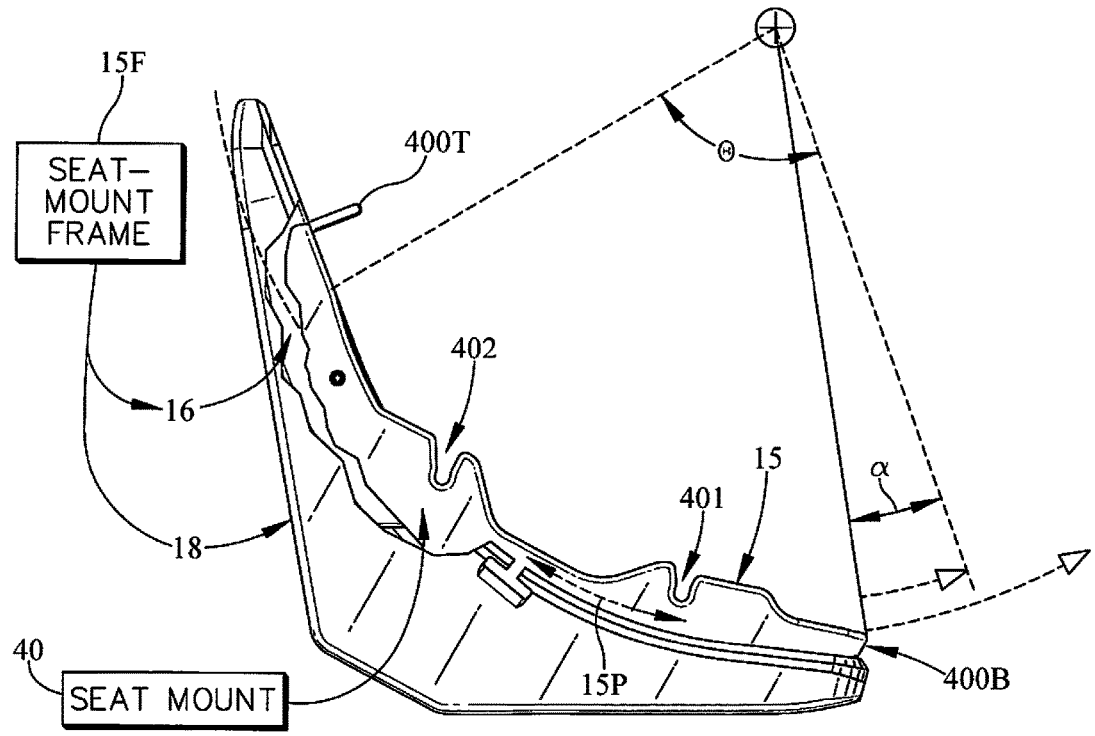
FIG. 5A is a side elevation view of the seat-support base of FIG. 1 showing the slidable seat mount in the RAISED-AND-RETRACTED position relative to the seat-mount frame.

A juvenile holder 10 in accordance with the present disclosure includes a seat-support base 12 that is adapted to set on a vehicle passenger seat 13 and a juvenile seat 14 that is configured to be mounted on seat-support base 12 as suggested in FIGS. 1 and 2. A slidable seat mount 15 is included in seat-support base 12 and configured to mate with juvenile seat 14 to support juvenile seat 14 in a selected stationary position and orientation relative to vehicle passenger seat 13 as suggested in FIGS. 2, 4, 5B, and 6B.

Slidable seat mount 15 is configured to slide up and down on seat-mount frame 15F under the control of a caregiver between a RAISED-AND-RETRACTED position shown, for example, in FIG. 1 to support juvenile seat 14 in a first orientation and a LOWERED-AND-EXTENDED position shown, for example, in FIG. 4 to support juvenile seat 14 in another (e.g. fifth) orientation. By moving slidable seat mount 15 on seat-mount frame 15F between RAISED-AND-RETRACTED and LOWERED-AND-EXTENDED positions (and various INTERMEDIATE positions therebetween) in accordance with the present disclosure a caregiver can change the position and orientation of juvenile seat 14 relative to vehicle passenger seat 13 while seat-mount frame 15F of seat-support base 12 is installed on vehicle passenger seat 13 and without separating juvenile seat 14 from seat-support base 12.

Seat-support base 12 of juvenile holder 10 includes a foundation 18, a pivotable belt clamp 16 coupled to foundation 18, and a slidable seat mount 15 coupled to pivotable belt clamp 16 as suggested in FIGS. 1, 7, 11, and 12. Foundation 18 and pivotable belt clamp 16 cooperate to form seat-mount frame 15F as suggested in FIG. 1. Foundation 18 is adapted to set on vehicle passenger seat 13 and be held in a stationary position on passenger seat 13, for example, using lap and shoulder straps 191, 192 of vehicle seat belt 19 as shown in FIG. 1. Pivotable belt clamp 16 is mounted for pivotable movement about a forward clamp-pivot axis 16A associated with foundation 18 as shown in FIGS. 12 and 13. Slidable seat mount 15 is mounted for up-and-down sliding movement on pivotable belt clamp 16 of seat-mount frame 15F as suggested in FIGS. 2 and 4 when pivotable belt clamp 16 is retained in a CLOSED BELT-TRAPPING position trapping portions of lap and shoulder belts 191, 192 of vehicle seat belt 19 between foundation 18 and pivotable belt clamp 16 so that the orientation of the juvenile seat 14 mounted on slidable seat mount 15 changes as slidable seat mount 15 slides along pivotable belt clamp 16 of seat-mount frame 15F.

Pivotable belt clamp 16 of seat-support base 12 is used in an illustrative embodiment as suggested in FIGS. 3 and 13 in cooperation with foundation 18 of seat-support base 12 to anchor seat-support base 12 in a stationary position on vehicle passenger seat 13 by clamping portions of lap and shoulder straps 191, 192 of a vehicle seat belt 19. Pivotable belt clamp 16 and foundation 18 cooperate to form a seat-mount frame 15F that is adapted to set on vehicle passenger seat 13 and support the slidable seat mount 15 as suggested in FIG. 1.

Figure 6A:
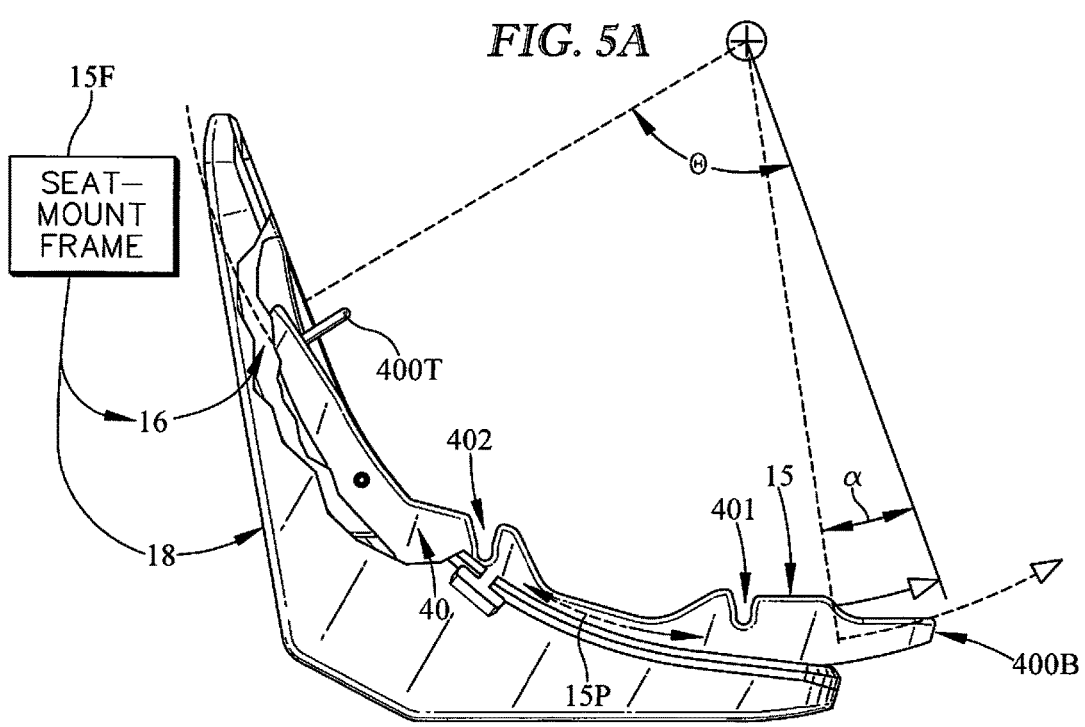
FIG. 6A is a side elevation view of the seat-support base of FIG. 3 showing the slidable seat mount in the LOWERED-AND-EXTENDED position relative to the seat-mount frame.
Figure 5B:
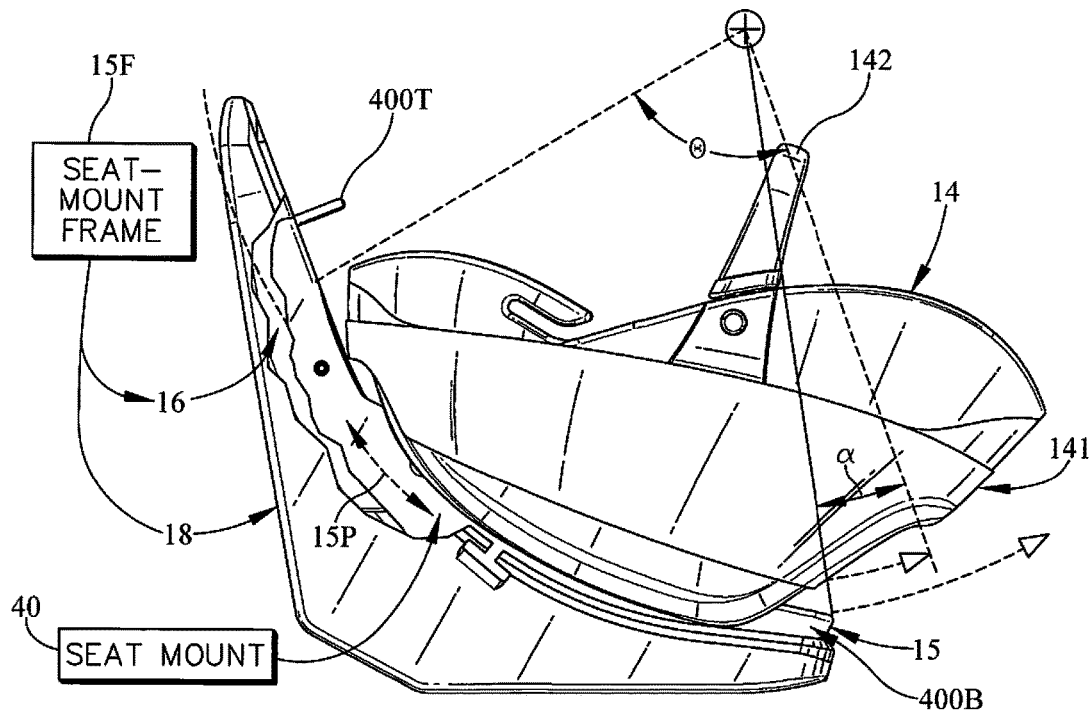
FIG. 5B is a side elevation view of the child restraint of FIG. 2 showing the juvenile seat in the first seat orientation when the slidable seat mount is retainer in the RAISED-AND-RETRACTED position relative to the seat-mount frame.
Figure 6B:
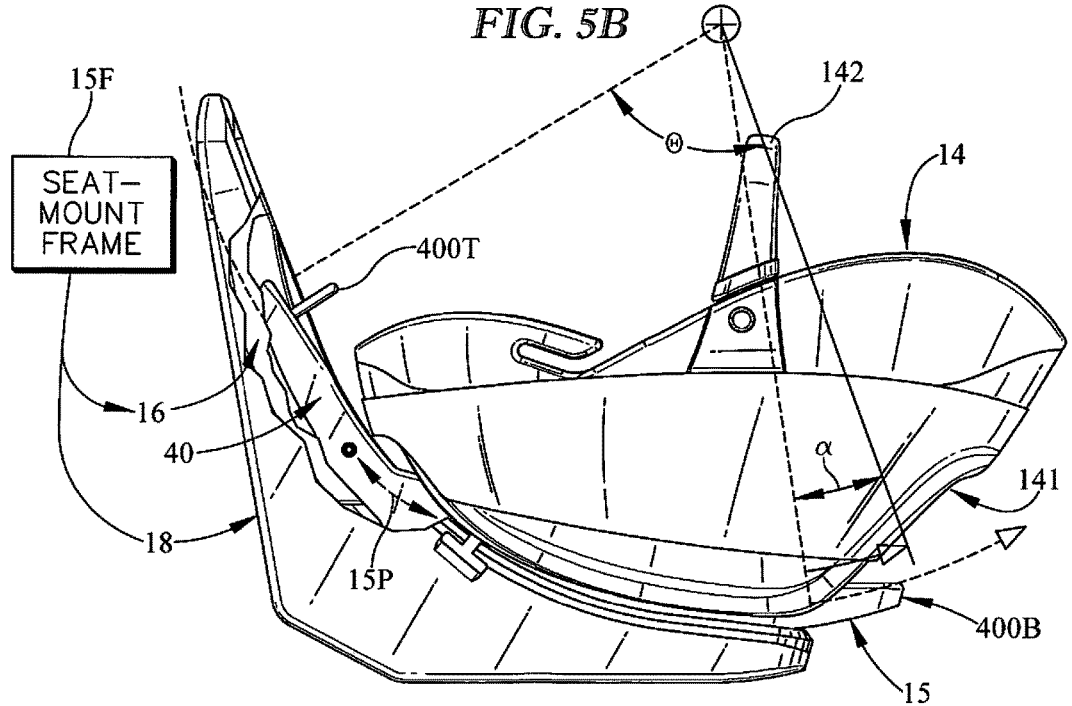
FIG. 6B is a side elevation view of the child restraint of FIG. 4 showing the juvenile seat in the different (e.g. fifth) seat orientation when the slidable seat mount is retained in the LOWERED-AND-EXTENDED position relative to the seat-mount frame.
Figure 7:
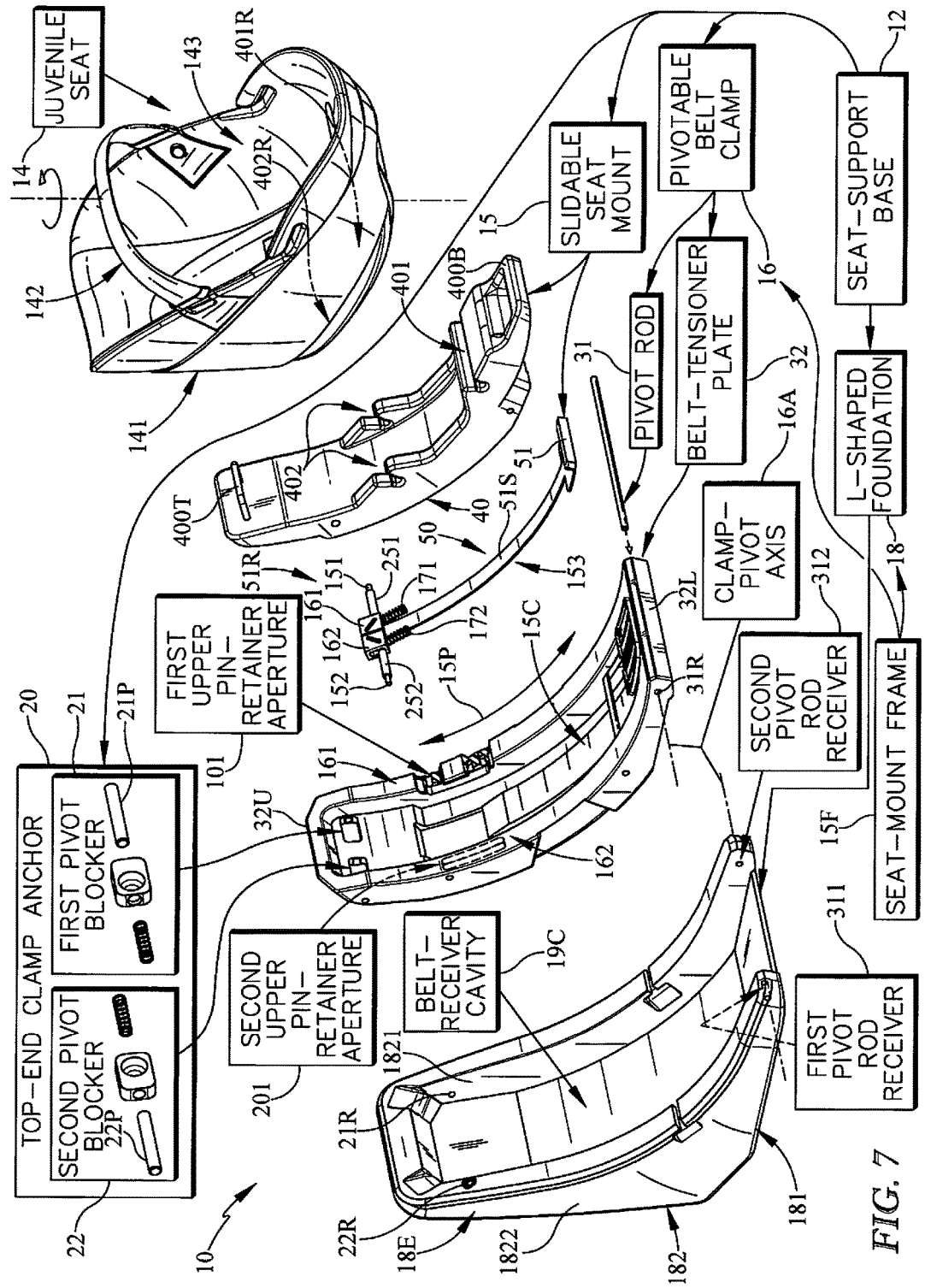
FIG. 7 is an exploded perspective assembly view of the child restraint of FIGS. 2 and 4 showing that the seat-support base comprises a seat-mount frame that includes an L-shaped foundation and a pivotable belt clamp and that the seat-support base further comprises a slidable seat mount that is adapted to slide on the pivotable belt clamp of the seat-mount frame from the RAISED-AND-RETRACTED position shown in FIGS. 1 and 5A to the LOWERED-AND-EXTENDED position shown in FIGS. 3 and 6A.

Slidable seat mount 15 is arranged to slide back and forth along a path 15P provided on pivotable belt clamp 16 of seat-mount frame 15F as suggested in FIGS. 1 and 7 while pivotable belt clamp 16 is retained in a stationary position on foundation 18 under the control and guidance of a caregiver as suggested in FIGS. 10-12, 14, and 15 to change the orientation of the juvenile seat 14 relative to seat-mount frame 15F from a first orientation shown in FIGS. 2 and 5B to another (e.g. fifth) orientation shown in FIGS. 4 and 6B. Path 15P is curved in the illustrated embodiment as suggested in FIGS. 5A, 6A, and 7. In the illustrated embodiment, a caregiver can select one of five available seat orientations for juvenile seat 14 simply by first unlocking and then sliding the slidable seat mount 15 relative to the underlying other portions of seat-support base 12 while seat-support base 12 is anchored to vehicle passenger seat 13 and while juvenile seat 14 is mounted on slidable seat mount 15.

Figure 8:
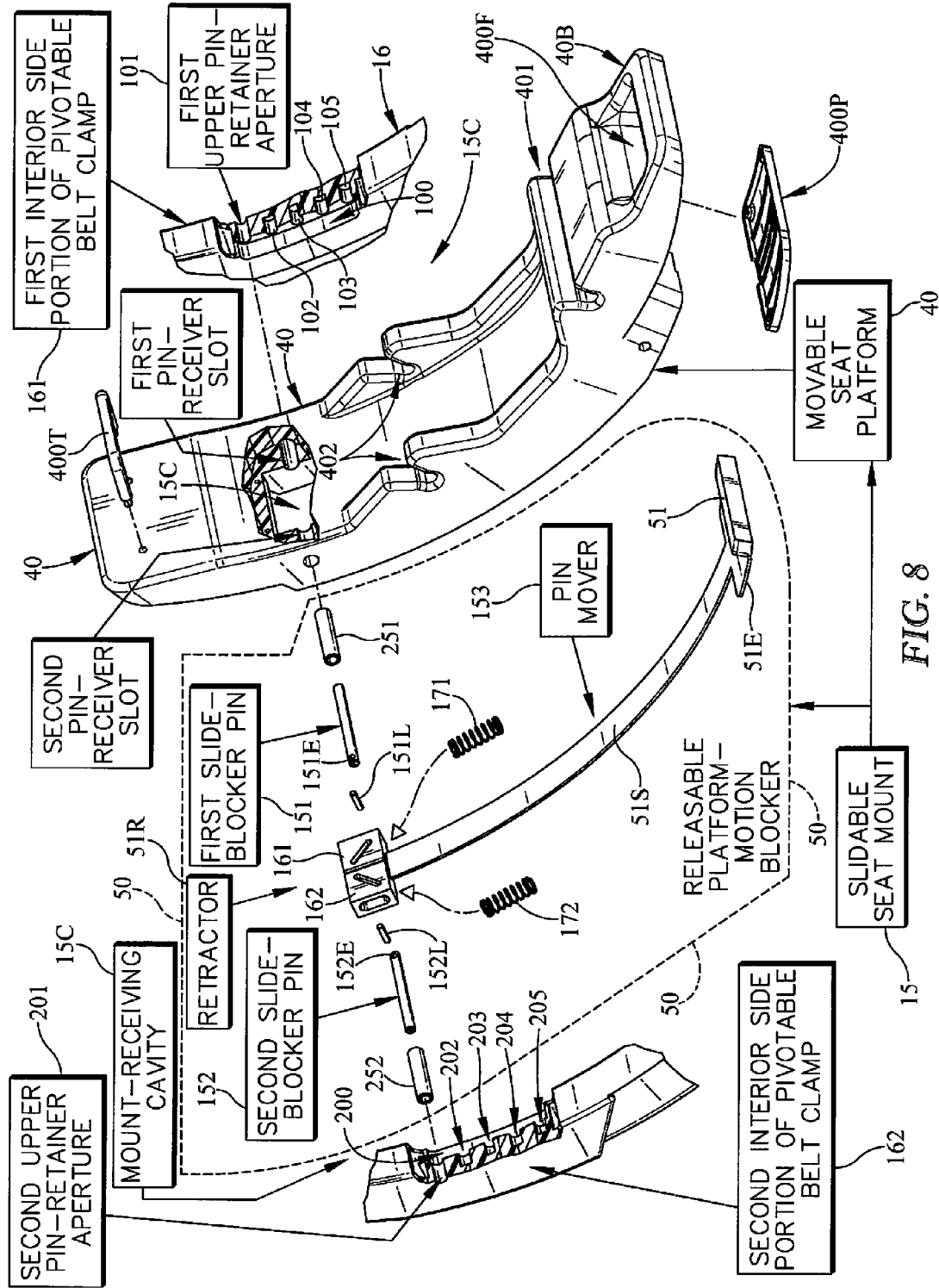
FIG. 8 is an exploded perspective assembly view of the slidable seat mount showing that the slidable seat mount includes a movable seat platform for mating with the underside of the juvenile seat and a releasable platform-motion blocker for locking the movable seat platform in a selected stationary position on the pivotable belt clamp of the seat-mount frame and showing that the components of the releasable platform-motion blocker are located in a mount-receiving cavity formed between first and second interior side portions of the pivotable belt clamp and showing alignment of a first slide-blocker pin with a first upper pin-retainer aperture formed in the first interior side portion of the pivotable belt clamp and alignment of a second slide-blocker pin with a second upper pin-retainer aperture formed in the second interior side portion of the pivotable belt clamp and also showing (1) a spring-biased pin mover that is located between the first and second slide-blocker pins and adapted to be mounted on the underside of the seat platform and (2) interior side portions of the pivotable belt clamp that are formed to include one or more pin-retainer apertures through which the first and second slide-blocker pins move during actuation of the releasable platform-motion blocker by a caregiver.

As suggested in FIGS. 4 and 8, pivotable belt clamp 16 is formed to include, for example, a set of five inwardly opening first pin-retainer apertures 101, 102, 103, 104, and 105. Each of those pin-retainer apertures 101-105 corresponds to one of the five juvenile seat orientations available for juvenile seat 14. In illustrative embodiments, each of the pin-retainer apertures 101-105 is associated with one and only one of the five available juvenile seat orientations. For example, upper (first) pin-retainer aperture 101 is associated with the first orientation of juvenile seat 18 as suggested in FIGS. 2, 5B, and 15 while lower (fifth) pin-retainer aperture 105 is associated with the fifth orientation of juvenile seat 14 as suggested in FIGS. 4, 6B, and 15. Second, third, and fourth pin-retainer apertures 102-104 are associated with three other orientations of juvenile seat 14. In illustrative embodiments, pin-retainer apertures 101-105 are formed in a first interior side portion 161 of pivotable belt clamp 16 as suggested in FIGS. 7, 8, and 11.

Slidable seat mount 15 includes a movable seat platform 40 adapted to mate with and be coupled to the overlying juvenile seat 14 to support juvenile seat 14 in a stationary position on seat-mount frame 15F and in one of the available seat orientations corresponding to the first pin-retainer apertures 101-105 formed in pivotable belt clamp 16 as suggested in FIGS. 1, 2, and 7. Slidable seat mount 15 also includes a releasable platform-motion blocker 50 that is coupled to the seat platform 40 to move with seat platform 40 relative to foundation 18 as suggested in FIGS. 1-4. Platform-motion blocker 50 includes oppositely extending spring-biased first and second slide-blocker pins 151, 152 and a pin mover 153 for moving pins 151, 152 relative to pivotable belt clamp 16 under the control of a caregiver to withdraw the spring-biased first and second slide-blocker pins 151, 152 from engagement with the pivotable belt clamp 16 to free seat platform 40 of slidable seat mount 15 to be moved up and down by a caregiver relative to the pivotable belt clamp 16 as suggested in FIGS. 1-4, 5A, and 6A to change the position and orientation of juvenile seat 14 relative to foundation 18 as shown, for example, in FIGS. 5B and 6B.

As also suggested in FIGS. 4 and 8, a first slide-blocker pin 151 included in platform-motion blocker 50 of slidable seat mount 15 is arranged to extend outwardly and can be moved by the caregiver into one of the five available companion inwardly opening pin-retainer apertures 101-105 formed in pivotable belt clamp 16 to anchor the movable seat platform 40 of slidable seat mount 15 in one of five predetermined stationary positions on the pivotable belt clamp 16 of seat-mount frame 15F to establish the orientation of juvenile seat 14 relative to seat-support base 12 on vehicle passenger seat 13. A pin mover 153 also is included in platform-motion blocker 50 of slidable seat mount 15 and coupled to first slide-blocker pin 151 as suggested in FIGS.

7 and 8. Pin mover 153 can be gripped and operated by the caregiver as suggested in FIGS. 14 and 15 to withdraw first slide-blocker pin 151 from a pin-retainer aperture 101, 102, 103, 104, or 105 to free slidable seat mount 15 to move up and down along a curved path 15P provided on pivotable belt clamp 16 of seat-mount frame 15F between the RAISED-AND-RETRACTED position shown in FIGS. 2, 5A, 5B, and 10 and the RAISED-AND-EXTENDED position shown in FIGS. 3, 4, 6A, 6B, and 12.

Pin mover 153 includes a pull handle 51, a blocker-pin retractor 51R, and a strap 51S arranged to interconnect pull handle 51 and blocker-pin retractor 51R as suggested in FIGS. 8, 9A, 9B, 14, and 15. In use, a caregiver can pull on pull handle 51 to cause strap 51S to apply a pulling force $F_P$ to blocker-pin retractor 51R that causes first slide-blocker pin 151 to be withdrawn from a pin-retainer aperture 101, 102, 103, 104, or 105 formed in pivotable belt clamp 16 to free movable seat platform 40 of slidable seat mount 15 to move along curved path 15P on pivotable belt clamp 16 of seat-mount frame 15F to change the position and orientation of a juvenile seat 14 coupled to movable seat platform 40.

Pull handle 51 is arranged to lie in close proximity to a bottom end 40B of movable seat platform 40 and to be accessed by a caregiver during actuation of blocker-pin retractor 51R as suggested in FIGS. 8, 9A, and 11-13. Bottom end 40B comprises a bottom grip handle 400B having an upwardly facing finger-receiving opening 400F as shown in FIG. 8 and a cover plate 400P configured to be mounted on the underside of bottom grip handle 400B as suggested in FIGS. 8 and 9B. Bottom grip handle 400B is arranged to lie in spaced-apart relation to a top grip handle 40T that is included in an opposite top end 40T of movable seat-platform 40 as shown, for example, in FIGS. 8 and 9A. With a thumb of a caregiver on an exterior surface of bottom grip handle 400B and the remaining fingers of the caregiver extending through finger-receiving opening 400F and engaging an exposed surface 51E (See FIG. 8) of pull handle 51, the caregiver can draw those fingers toward the thumb to apply pulling force $F_P$ to move pull handle 51 and strap 51S away from top grip handle 400T to cause blocker-pin retractor 51R to withdraw first slide-blocker pin 151 from one of the pin-retainer apertures 101, 102, 103, 104, or 105 formed in pivotable belt clamp 16 to free movable seat platform 40 of slidable seat mount 15 to move along curved path 15P on pivotable belt clamp 16 of seat-mount frame 15F to change the position and orientation of the juvenile seat 14 that is coupled to movable seat platform 40.

A first pin-transfer slot 110 is formed in first interior side portion 161 of pivotable belt clamp 16 as suggested in FIGS. 8, 11, 14, and 15 and sized to receive a portion of first slide-blocker pin 151 as that pin 151 is moved between pin-retainer apertures 101-105 by caregiver as suggested in FIGS. 10-12 to change the position and orientation of the juvenile seat 14 carried on the pivotable belt clamp 16 of seat-mount frame 15F. First pin-transfer slot 100 is arranged to communicate with an inner open end of each of pin-retainer apertures 101-105 as shown best in FIGS. 14 and 15. First pin-transfer slot 100 is also arranged to open into a mount-receiving cavity 15C that is formed in pivotable belt clamp 16 and is sized to receive a portion of movable seat platform 40 and platform 50 of slidable seat mount 15 as suggested in FIGS. 7 and 10.

A second interior side portion 162 of pivotable belt clamp 16 is formed to include a series of pin-retainer apertures 201-205 and a companion second pin-transfer slot 200 aligned to communicate with each of the pin-retainer apertures 201-205 as suggested in FIG. 8. A second slide-blocker pin 152 included in platform-motion blocker 50 of slidable seat mount 15 is arranged to extend outwardly away from first slide-blocker pin 151 and can be moved by the caregiver into one of the five available companion inwardly opening pin-retainer apertures 201-205 so as to cooperate with the first slide-blocker pin 151 to anchor the movable seat platform 40 of slidable seat mount 15 in one of the five predetermined stationary positions on the pivotable belt clamp 16 of seat-mount frame 15F to establish the position and orientation of juvenile seat 14 relative to seat-support base 12 on vehicle passenger seat 13. Pin mover 153 of platform-motion blocker 50 also is coupled to second slide-blocker pin 152 and can be operated by a caregiver gripping and pulling the pull handle 51 of platform-motion blocker 50 to withdraw second slide-blocker pin 152 from one of the companion pin-retainer apertures 201-205 at the same time. The first slide-blocker pin 151 is withdrawn by pin mover 153 from an aligned one of the companion pin-retainer apertures 101-105.

Seat-support base 12 can remain in the anchored stationary position on passenger seat 13 and a caregiver can mount a juvenile seat 14 on seat-support base 12 when it is desired to transport a young child or infant in the vehicle as suggested in FIGS. 1-4. In accordance with the present disclosure, juvenile seat 14 can be an infant carrier as shown or a seat sized to carry an older child.

Seat-support base 12 includes a foundation 18 that is adapted to set on passenger seat 13, a pivotable belt clamp 16 arranged to pivot relative to foundation 18 about a forward clamp-pivot axis 16A, and a slidable seat mount 15 coupled to pivotable belt clamp 16 to pivot with the belt clamp 16 and configured to mate with the overlying juvenile seat 14. Seat mount 15 is a seat-position and seat-orientation controller that is arranged to slide up and down on the pivotable belt clamp 16 of seat-mount frame 15F under the control of a caregiver to change the position and orientation of a juvenile seat 14 that is mounted on the slidable seat mount 15 while seat-support base 12 is installed on passenger seat 13 and without separating juvenile seat 14 from seat-support base 12.

After the slidable seat mount 15 has been slid by a caregiver in an upward first direction to a RAISED-AND-RETRACTED position on the pivotable belt clamp 16 as shown in FIG. 2, a juvenile seat 14 coupled to the slidable seat mount 15 is retained in a first position and orientation relative to the foundation 18 of the seat-support base 12. Alternatively, after the slidable seat mount 15 has been slid by a caregiver in an opposite (downward) second direction to a LOWERED-AND-EXTENDED position on the pivotable belt clamp 16 as shown in FIG. 4, the juvenile seat 14 is retained in a different orientation relative to the foundation 18 of the seat-support base 12. The RAISED-AND-RETRACTED position is associated with upper pin-retainer apertures 101, 201 while the LOWERED-AND-EXTENDED position is associated with lower pin-retainer apertures 105, 205. In illustrative embodiments, three INTERMEDIATE positions (associated with the second, third, and fourth pin-retainer apertures 102-104 and 202-204 formed in pivotable belt clamp 16) are provided between the RAISED-AND-RETRACTED and LOWERED-AND-EXTENDED positions so that caregiver can select one of five possible orientations for juvenile seat 14 relative to foundation 18 of seat-support base 12.

In illustrative embodiments, pivotable belt clamp 16 can be pivoted forwardly by a seat installer about a forward clamp-pivot axis 16A away from foundation 18 to an OPENED BELT-RECEIVING position as suggested in FIG.

13 to expose a belt-receiver cavity 19C formed in foundation 18. The seat installer can then place portions of lap and shoulder straps 191, 192 included in the vehicle seat belt 19 in the exposed belt-receiver cavity 19C. Then the seat installer can pivot the belt clamp 16 rearwardly toward the foundation 18 to a CLOSED BELT-TRAPPING position as shown in FIGS. 1-4 to trap the seat belt portions 191, 192 in the belt-receiver cavity 19C and tension the lap and shoulder straps 191, 192 included in the vehicle seat belt 19 so that seat-support base 12 is anchored in a stationary position on passenger seat 13. When the belt clamp 16 is pivoted to the CLOSED BELT-TRAPPING position, the slidable seat mount 15 that is coupled to the belt clamp 16 is oriented in a suitable position to engage and support juvenile seat 14 in a stationary position relative to seat-support base 12. The caregiver can slide the seat mount 15 up and down along a concave curved path 15P provided on pivotable belt clamp 16 as disclosed herein to change the position and orientation of the juvenile seat 14 that is mated with the slidable seat mount 15 to achieve one of the five available seat orientations without first having to pivot belt clamp 16 to an OPENED BELT-RECEIVING position to separate foundation 18 from passenger seat 13.

In illustrative embodiments, juvenile seat 14 is an infant carrier including a seat bucket 141 and a carry handle 142 that is coupled to seat bucket 141 and arranged normally to lie above an infant-receiving space 143 formed in seat bucket 141 as suggested in FIG. 7. In alternative embodiments, juvenile seat 14 is an upright seat for an older child.

Seat-support base 12 includes an L-shaped foundation 18 adapted to set on passenger seat 23, a pivotable belt clamp 16, and a curved seat mount 15 adapted to mate with juvenile seat 14 as suggested in FIGS. 1 and 2. L-shaped foundation and pivotable belt clamp 16 cooperate to form a seat-mount frame 15F on which juvenile seat 14 can be mounted. Pivotable belt clamp 16 and curved seat mount 15 cooperate to form a unit that is configured to pivot about forward clamp-pivot axis 16A as a unit as suggested in FIG. 13 and is configured to mate with juvenile seat 14 when pivotable belt clamp 16 is placed and locked in a CLOSED BELT-TRAPPING position as suggested in FIGS. 1-4, 10, 11, and 12.

Pivotable belt clamp 16 is configured to be pivoted relative to L-shaped foundation 18 about a forward clamp-pivot axis 16A during a base-anchoring process between an OPENED BELT-RECEIVING position shown in FIG. 13 and a CLOSED BELT-TRAPPING position shown in FIGS. 1-4. Once the pivotable belt clamp 16 has been opened as suggested in FIG. 13, a caregiver can place portions of seat belt 19 in a belt-receiver-cavity 19C formed in L-shaped foundation 18 and then pivot the pivotable belt clamp 16 about forward clamp-pivot axis 16A in a rearward direction toward the CLOSED BELT-TRAPPING position. When pivotable belt clamp 16 arrives at the CLOSED BELT-TRAPPING position as shown in FIG. 2, a top-end clamp anchor 20 included in seat-support base 12 and coupled to pivotable belt clamp 16 as suggested diagrammatically in FIG. 7 engages a top end 18E of L-shaped foundation 18 to retain pivotable belt clamp 16 in the CLOSED BELT-TRAPPING position so that seat-mount frame 15F of seat-support base 12 is retained in a stationary position on passenger seat 13 as suggested in FIGS. 1-4.

L-shaped foundation 18 of seat-support base 12 is shown, for example, in FIG. 7. Foundation 18 generally is L-shaped although it is within the scope of the present disclosure to vary the shape of foundation 18 as needed to adapt to an underlying vehicle passenger seat 13 or other base-support platform and/or to adapt to a desired juvenile seat. Foundation 18 includes a forwardly extending bottom 181 adapted to mate with a seat bottom of vehicle passenger seat 13 and an upwardly extending back 182 adapted to mate with a seat back of vehicle passenger seat 13 as suggested in FIG. 3. Bottom 181 includes a forward lower end associated with forward clamp-pivot axis 16A as suggested in FIG. 7. Back 182 includes a free top end 18E that is adapted to be coupled to top-end anchor clamp 20 as suggested in FIG. 4.

Bottom 181 of L-shaped foundation 18 is formed to include first and second pivot-rod receivers 311, 312 as suggested in FIG. 7. A pivot rod 31 included in pivotable belt clamp 16 has a first end that is arranged to extend into first pivot rod receiver 311 and an opposite second end that is arranged to extend into second pivot rod receiver 312. Pivot rod 21 is arranged to extend horizontally and establish forward clamp-pivot axis 16A as suggested in FIG. 7.

Upper portions of first and second side walls 1821, 1822 of back 182 of L-shaped foundation 18 are formed to mate with top-end clamp anchor 20 when pivotable belt clamp 16 is pivoted about forward clamp-pivot axis 16A to assume the CLOSED BELT-TRAPPING position as suggested in FIGS. 1-4. First side wall 1821 is formed to include first retainer pin receiver 21R to receive a retainer pin 21P of a first pivot blocker 21 included in top-end clamp anchor 20 as suggested in FIG. 7. Second side wall 1822 is formed to include second retainer pin receiver 22R to receive a retainer pin 22P of a second pivot blocker 22 included in the top-end clamp anchor 20 as suggested in FIG. 7.

Top-end clamp anchor 20 is coupled to pivotable belt clamp 16 as suggested in FIG. 7 and covered by slidable seat mount 15 so that it is hidden from view as suggested in FIGS. 1 and 2. Seat mount 15 is configured to slide relative to the underlying pivotable belt clamp 16 of seat-mount frame 15F from a RETRACTED ANCHOR-HIDING position shown in FIGS. 1 and 2 to an EXTENDED ANCHOR-ACCESS position shown in FIGS. 3 and 4 so that a caregiver can access and operate top-end clamp anchor 20 to release the pivotable belt clamp 16 so it can pivot forwardly about forward clamp-pivot axis 16A as suggested in FIG. 13.

Pivotable belt clamp 16 includes pivot rod 31 and a belt-tensioner plate 32 as shown, for example, in FIG. 4. Pivot rod 31 passes through one or more pivot rod receivers 31R formed in a lower end 32L of belt-tensioner plate 32 to support belt-tensioner plate 32 for pivotable movement about forward clamp-pivot axis 16A toward and away from back 182 of L-shaped foundation 18. Belt-tensioner plate 32 is sized to fit relatively snugly in belt-receiver cavity 19C formed in L-shaped foundation 18 when pivotable belt clamp 16 is pivoted to its CLOSED BELT-TRAPPING position shown, for example, FIGS. 1-4 and 10-12. An upper end 32U of belt-tensioner plate 32 is formed to provide means for carrying each of the first and second pivot blockers 21, 22 of top-end clamp anchor 20 as suggested in FIG. 7. The upper end 32U of belt-tensioner plate 32 is formed to include pin receivers through which retainer pins 21P, 22P pass to extend into pin receivers 21R, 22R formed in side walls 1811, 1821 of back 182 of L-shaped foundation 18.

Belt-tensioner plate 32 of pivotable belt clamp 16 is formed to include first and second interior side portions 161, 162 and the mount-receiving cavity 15C as shown, for example, in FIG. 7. First interior side portion 161 of belt-tensioner plate 32 is formed to include first pin-transfer slot 100 and pin-retainer apertures 101-105 as suggested in FIG. 3. Second interior side portion 162 of belt-tensioner plate 32 is formed to include second pin-transfer slot 200 and pin-retainer apertures 201-205 as suggested in FIG. 8.

Seat mount 15 is coupled to belt-tensioner plate 32 to pivot therewith about forward clamp-pivot axis 16A as suggested in FIG. 13. Seat mount 15 and belt-tensioner plate 32 of pivotable belt clamp 16 cooperate to form a unit that is configured to be mate with juvenile seat 14 as suggested in FIGS. 1 and 2 after pivotable belt clamp 16 has been pivoted about forward clamp-pivot axis 16A to assume the CLOSED BELT-TRAPPING position as suggested in FIGS. 2 and 4. Seat mount 15 is sized and shaped to slide up and down in the mount-receiving cavity 15C formed in belt-tensioner plate 32 as seat mount 15 moves between the RAISED-AND-RETRACTED and LOWERED-AND-EXTENDED positions to change the position and orientation of the juvenile seat 14 the is mounted on seat mount 15.

Seat mount 15 is curved in illustrative embodiments as shown, for example, in FIG. 7. Seat mount 15 can move relative to belt-tensioner plate 32 of pivotable belt clamp 16 back and forth along a curved path 15P as suggested in FIGS. 5A, 5B, 6A, and 6B at the option of a caregiver to change the position and orientation of seat mount 15 (and therefore the position and orientation of a juvenile seat 14 coupled to seat mount 15) relative to L-shaped foundation 18.

Seat mount 15 also includes a releasable platform-motion blocker 50 that is coupled to the movable seat platform 40 as suggested in FIGS. 9A and 9B to move therewith up and down along curved path 15P as suggested in FIGS. 10-12. The releasable platform-motion blocker 50 is configured to provide means for controlling movement of movable seat platform 40 relative to belt-tensioner plate 32 of pivotable belt clamp 16 to establish a desired position and orientation of juvenile seat 14 on movable seat platform 40 relative to L-shaped foundation 18.

Seat mount 15 includes a movable seat platform 40 that is shown in FIGS. 7-9 and arranged to slide up and down along curved platform-motion belt path 15P on pivotable belt clamp 16 at seat-mount frame 15F from a RETRACTED ANCHOR-HIDING position shown in FIG. 10 to an EXTENDED ANCHOR-ACCESS position shown in FIG. 11 at the option of a caregiver. Top-end clamp anchor 20 is revealed and exposed so that it can be accessed and operated by a caregiver when seat mount 15 is slid on pivotable belt clamp 16 to the EXTENDED ANCHOR-ACCESS position as shown in FIG. 4.

Seat mount 15 is formed to include a top pull handle 400T that can be gripped and used by a caregiver to cause a unit comprising pivotable belt clamp 16 and slidable seat mount 15 to pivot about forward clamp-pivot axis 16A so that pivotable belt clamp 16 can be pivoted by a caregiver easily between the CLOSED BELT-TRAPPING position shown in FIGS. 10-12 and the OPENED BELT-RECEIVING position shown in FIG. 13. Seat mount 15 also includes a first rod retainer 401 for receiving and mating with a first retainer rod 401R included on the underside of juvenile seat 14 and a companion second rod retainer 402 for receiving and mating with a second retainer rod 402R included on the underside of juvenile seat 14 as suggested in FIGS. 7 and 9A. Second rod retainer 402 is arranged to lie between top pull handle 400T and first rod retainer 401.

Slidable seat mount 15 includes a movable seat platform 40 for mating with the juvenile seat 14 and a releasable platform-motion blocker 50 for locking movable seat platform 40 in a selected stationary position on pivotable belt clamp 16 as suggested in FIGS. 7-9B. The components of the releasable platform-motion blocker 50 are located in a mount-receiving cavity 15C formed between first and second interior side portions 161, 162 of pivotable belt clamp 16 as suggested in FIG. 8. Alignment of a first slide-blocker pin 151 with a first upper pin-retainer aperture 101 formed in the first interior side portion 161 of the pivotable belt clamp 16 and alignment of a second slide-blocker pin 152 with a second upper pin-retainer aperture 201 formed in the second interior side portion 162 of the pivotable belt clamp 162 is shown in FIG. 8.

Spring-biased pin mover 153 of platform-motion blocker 50 is located between the first and second slide-blocker pins 151, 152 and adapted to be mounted on the underside of the movable seat platform 40 as suggested in FIGS. 7-9B. Belt tensioner plate 32 is formed to include one or more pin-retainer apertures 101-105 and 201-205 through which the first and second slide-blocker pins 151, 152 move during actuation of the releasable platform-motion blocker 50 by a caregiver.

A top perspective view of the slidable seat mount 15 with portions broken away is provided in FIG. 9A to show the releasable platform-motion blocker 50 after it is mounted in some cavities and slots formed in the movable seat platform 40. The first slide-blocker pin 151 is arranged to extend through a passageway formed in a companion stationary first glide collar 251 and biased outwardly in a first direction by pin mover 153 to assume an EXTENDED position. The second slide-blocker pin 152 is arranged to extend through a passageway formed in a companion stationary second glide collar 252 and biased outwardly in an opposite second direction by the spring-biased pin mover 153 to assume an EXTENDED position. A bottom perspective view of the slidable seat mount 15 is provided in FIG. 9B to show visible portions of the releasable platform-motion blocker 50 and the pivot rod 31.

Pin mover 153 comprises a first block 161 formed to include a first angled guide slot 151S and associated with the first slide-blocker pin 151 and a second block 162 formed to include a second angled guide slot 162S and associated with the second slide-blocker pin 152 as suggested in FIG. 8. The first angled guide slot 161S has a negative slope and the second angled guide slot 162S has a positive slope in an illustrative embodiment shown in FIG. 8. Pin mover 153 also includes a pull handle 51 and an elongated strap 51S arranged to interconnect the pull handle 51 and the first and second blocks 161, 162 of blocker-pin retractor 51R.

Figures 14, 15:
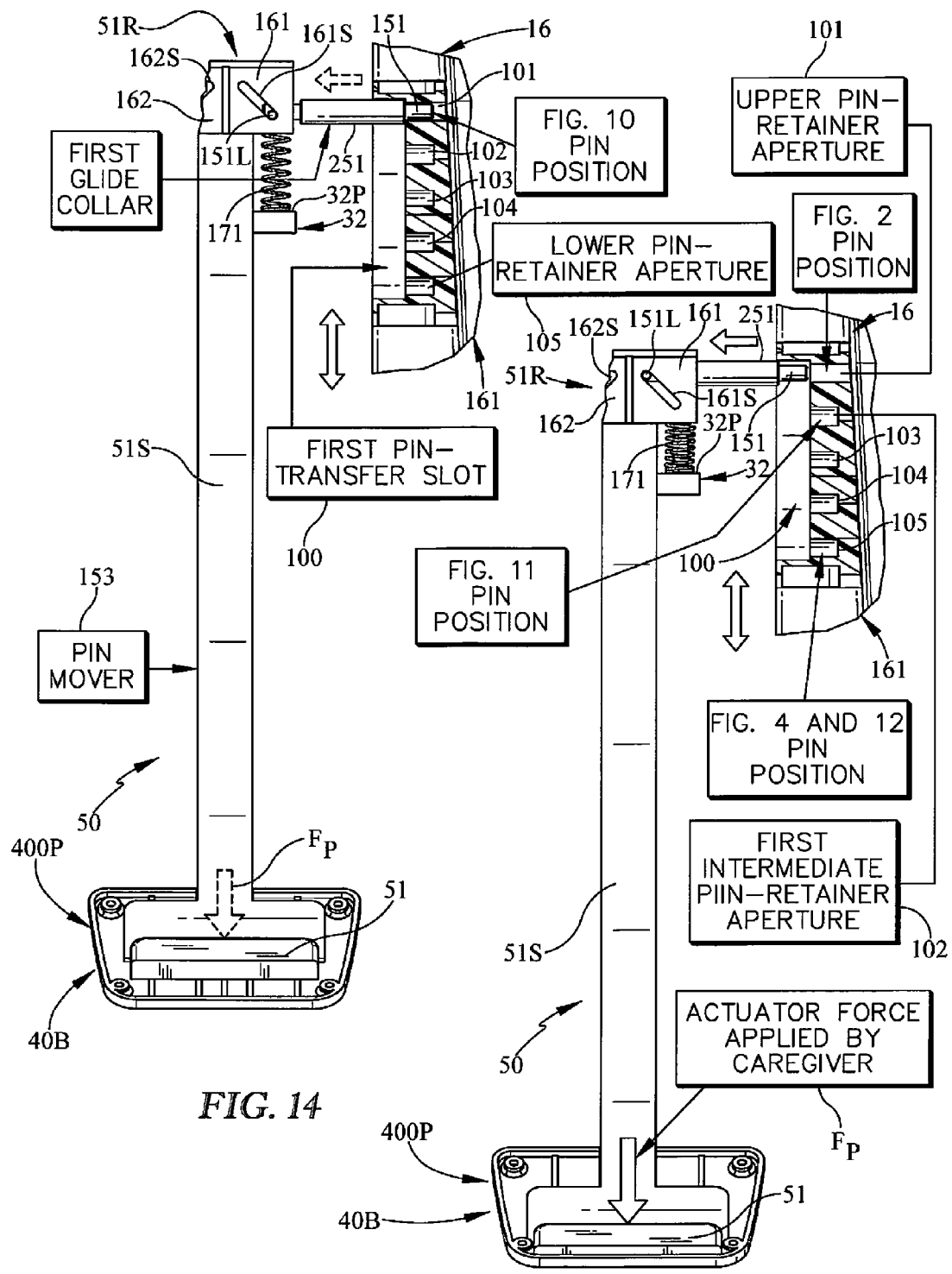
FIG. 14 is an enlarged view of portions of the releasable platform-motion blocker of the pin mover and the first interior side portion of the pivotable belt clamp showing extension of the first slide-blocker pin into the first upper pin-retainer aperture formed in the first interior side portion of the pivotable belt clamp and placement of an outer portion of the companion first glide collar in a pin-transfer slot formed in the first interior side portion of the pivotable belt clamp and arranged to communicate with each of the five pin-retainer apertures formed in that first interior side portion.
FIG. 15 is a view similar to FIG. 14 showing that the caregiver has applied an ACTUATOR FORCE to a pull handle included in the releasable platform-motion blocker to cause the first slide-blocker pin to be withdrawn from the companion first upper pin-retainer aperture so that the first glide collar and the first slide-blocker pin can be moved downwardly in the pin-transfer slot toward the other pin-retainer apertures formed in the first interior side portion of the pivotable belt clamp.

Pin mover 153 also includes a first motion-transfer link 151L coupled to an inner end 151E of first slide-blocker pin 151 as suggested in FIG. 8 and arranged to slide back and forth in the first angled guide slot 161S formed in the first block 151 as suggested in FIGS. 14 and 15. Pin mover 153 also includes a second motion-transfer link 152L coupled to an inner end 152E of second slide-blocker pin 152 as suggested in FIG. 8. Second motion-transfer link 152L is arranged to slide back and forth in the second angled guide slot 162S formed in the second block 162.

First and second blocks 161, 162 are included in pin mover 153 and arranged to move back and forth along a block-motion path BP that is generally perpendicular to the pin-motion path PP along which both of the first and second slide-blocker pins 151, 152 move between their EXTENDED and RETRACTED positions as suggested in FIGS. 9A and 9B. One or more block-mover springs 171, 172 are also included in pin mover 153 of platform-motion blocker 50 and arranged to provide means for yieldably moving the first and second blocks 161, 162 relative to movable seat platform 40 to EXTENDED positions that are shown in FIGS. 9A, 9B, and 14 and are associated with the EXTENDED positions of first and second slide-blocker pins 151, 152. In an illustrative embodiment, one end of each block-mover spring 171, 172 engages one of the first and second blocks 161, 162 and an opposite end of each block-mover spring 171, 172 engages one of the first and second blocks 161, 162 and an opposite end of each block-mover spring 171, 172 engages a portion 32P of belt-tensioner plate 32 of pivotable belt clamp 16 as suggested in FIGS. 9A and 9B.

Strap 51S included in pin mover 153 is coupled to first and second blocks 161, 162 and to pull handle 51 as shown, for example, in FIGS. 8, 9A, 14, and 15. As suggested in FIGS. 14 and 15, a caregiver can apply a pull force Fp to pull handle 51 to cause strap 51S to move relative to belt-tensioner plate 32 and compress blocker-mover spring 171 as first and second blocks 161, 162 move from their EXTENDED positions shown in FIG. 14 to their RETRACTED positions shown in FIG. 15. Such movement of first and second blocks 161, 162 causes each motion-transfer link 151L, 152L to move in its companion angled guide slot 161S, 162S to cause the companion slide-blocker pin 151, 152 to move from its EXTENDED position to its RETRACTED position thereby freeing slidable seat mount 15 to be moved by the caregiver relative to the pivotable belt clamp 16. Once the caregiver releases the pull handle 51, block-mover springs 171, 172 move to the first and second blocks 161, 162 back to their EXTENDED positions to cause movement of the motion-transfer links 151L, 152L in their angled guide slots 161S, 162S sufficient to move the first and second slide-blocker pins 151, 152 back to their EXTENDED positions.

First and second slide-blocker pins 151, 152 are arranged to extend in opposite directions into companion upper pin-retainer 101-105 or 201-205 apertures formed in the pivotable belt clamp 16 to block sliding movement of the slidable seat mount 15 on the pivotable belt clamp 16 of seat-mount frame 15F and retain the slidable seat mount 15 in the a RAISED-AND-RETRACTED position on the pivotable belt clamp 16 as shown in FIG. 10. Placement of each of the first and second slide-blocker pins 151, 152 in a companion first intermediate pin-retainer aperture 102, 202 after (1) withdrawal of each slide-blocker pin 151, 152 from its companion upper pin-retainer aperture 101, 201 to free the slidable seat mount 26 to slide toward its LOWERED-AND-EXTENDED position downwarding along curved path 15P on the stationary pivotable belt clamp 16 is shown in FIG. 11. Downward movement of each slide-blocker pin 151, 152 in its companion pin-transfer slot 100, 200 to reach and then extend into the companion first intermediate pin-retainer aperture 102, 202 in communication with such pin-transfer slot 100, 200 is shown in FIG. 11. Each interior side portion 161, 162 of the pivotable belt clamp 16 is formed to include a vertically extending pin-transfer slot 100 or 200 and a series of five horizontally extending pin-retainer apertures (e.g. an upper pin-retainer aperture 101 or 201, three intermediate pin-retainer apertures 102-104 or 202-204, and a lower pin-retainer aperture 105 or 205).

As suggested in FIG. 12, the first and second slide-blocker pins 151, 152 are extended in to companion lower pin-retainer apertures 105, 205 formed in the pivotable belt clamp 16 to retain the slidable seat mount 15 in the EXTENDED position on the pivotable belt clamp 16. Portions of the releasable platform-motion blocker 50 of the pin mover 153 and the first interior side portion 161 of the pivotable belt clamp 16 are shown in FIG. 14. Extension of the first slide-blocker pin 151 into the first upper pin-retainer aperture 101 are shown in FIG. 14, formed in the first interior side portion 161 of the pivotable belt clamp 16 is shown. Placement of an outer portion of the companion first glide collar 251 in a pin-transfer slot 100 formed in the first interior side portion 161 of the pivotable belt clamp 16 is also shown. As suggested in FIG. 15, the caregiver has applied an ACTUATOR FORCE Fp to a pull handle 51 included in the releasable platform-motion blocker 50 to cause the first slide-blocker pin 151 to be withdrawn from the companion first upper pin-retainer aperture 101 so that the first glide collar 251 and the first slide-blocker pin 151 can be moved downwardly in the first pin-transfer slot 100 toward the other pin-retainer apertures 102-105 formed in the first interior side portion 161 of the pivotable belt clamp 16.

The invention claimed is:

1. A child restraint
comprising
a seat-mount frame adapted to set on a passenger seat in a vehicle,
a juvenile seat configured to seat a child, and
a slidable seat mount coupled to the juvenile seat and arranged to slide on an outwardly facing exterior surface of the seat-mount frame under the control of a caregiver to change the position and orientation of the juvenile seat relative to the seat-mount frame
wherein the underside of the juvenile seat is arranged to lie in confronting face-to-face relation to an entire topside of the slidable seat mount, and
wherein the slidable seat mount includes a movable seat platform that is arranged to slide up and down along a curved path on an exterior surface which provides a bottom wall of a mount-receiving cavity formed in the seat-mount frame from a raised-and-retracted position to support the juvenile seat in a first orientation relative to the seat-mount frame to a lowered-and-extended position to support the juvenile seat in a different orientation relative to the seat-mount frame and a releasable platform-motion blocker that is coupled to the movable seat platform to slide with the movable seat platform relative to the seat-mount frame and configured to releasably engage the seat-mount frame to retain the movable seat platform in a position and orientation on the seat-mount frame selected by a caregiver.

2. The child restraint of claim 1, wherein the seat-mount frame is formed to include a belt-receiver cavity configured to receive portions of shoulder and lap straps of a vehicle seat belt associated with the passenger seat and the belt-receiver cavity is located rearward of the slidable seat mount.

3. A child restraint comprising
a seat-mount frame adapted to set on a passenger seat in a vehicle,
a juvenile seat configured to seat a child, and
a slidable seat mount coupled to the juvenile seat and arranged to slide on the seat-mount frame under the control of a caregiver to change the position and orientation of the juvenile seat relative to the seat-mount frame,
wherein the slidable seat mount includes a movable seat platform that is arranged to slide up and down along a curved path on the seat-mount frame from a raised-and-retracted position to support the juvenile seat in a first orientation relative to the seat-mount frame to a lowered-and-extended position to support the juvenile seat in a different orientation relative to the seat-mount frame and a releasable platform-motion blocker that is coupled to the movable seat platform to slide with the movable seat platform relative to the seat-mount frame and configured to releasably engage the seat-mount frame to retain the movable seat platform in a position and orientation on the seat-mount frame selected by a caregiver and wherein the seat-mount frame includes a foundation adapted to set on a passenger seat in a vehicle and a pivotable belt clamp mounted for movement about a forward clamp-pivot axis associated with a forward bottom end of the foundation from an opened belt-receiving position in which a seat belt-receiver cavity formed in the foundation is exposed to receive portions of shoulder and lap straps of vehicle seat belt associated with the passenger seat in a direction toward a rearward top end of the foundation to trap the portions of the shoulder and lap straps in the seat belt-receiver cavity formed in the foundation to tension the shoulder and lap straps included in the vehicle seat belt so that the seat-mount frame is anchored in a stationary position on the passenger seat and wherein the movable seat platform is mounted for up-and-down sliding movement on the pivotable belt clamp.

4. The child restraint of claim 3, wherein the pivotable belt clamp is formed to include a first-orientation pin-retainer aperture associated with the raised-and-retracted position of the slidable seat mount and a different-orientation pin-retainer aperture associated with the lowered-and-extended position of the slidable seat mount, and the releasable platform-motion blocker includes a spring-biased first slide-blocker pin and a pin-mover means for moving the spring-biased first slide blocker pin relative to the pivotable belt clamp under the control of a caregiver to withdraw the spring-biased first slide blocker pin from one of the pin-receiver apertures formed in the pivotable belt clamp to free the movable seat platform to be moved up and down by the caregiver along the curved path to change the position and orientation of the juvenile seat that is coupled to the movable seat platform.

5. The child restraint of claim 4, wherein the pin-mover means include a pull handle, a blocker-pin retractor coupled to the spring-biased first slide-blocker pin, and a strap arranged to interconnect the pull handle and the blocker-pin retractor to cause the spring-biased first slide-blocker pin to be withdrawn from one of the pin-retainer apertures formed in the pivotable belt clamp when a caregiver applies a pulling force on the pull handle to free the movable seat platform of the slidable seat mount to move along the curved path on the pivotable belt clamp of the seat-mount frame.

6. The child restraint of claim 5, wherein the movable seat platform includes a bottom end located in close proximity to the forward clamp-pivot axis and an opposite top end and the pull handle of the pin-mover means is arranged to lie in close proximity to the bottom end of the movable seat platform.

7. A child restraint comprising a seat-mount frame including a foundation and a pivotable belt clamp, the foundation being adapted to set on a passenger seat in a vehicle and formed to include an upwardly facing belt-receiver cavity, the pivotable belt clamp including a belt-tensioner plate sized to be extended into the belt-receiver cavity and a pivot rod coupled to a bottom of the foundation and a lower end of the belt-tensioner plate to support the belt-tensioner plate for pivotable movement about a forward clamp-pivot axis associated with the bottom of the foundation toward and away from an upwardly extending back of the foundation between a closed belt-trapping position in which the belt-tensioner plate extends into the belt-receiver cavity to trap portions of a vehicle seat belt located therein between the foundation and the belt-tensioner plate to retain the foundation in a stationary position on the passenger seat and opened belt-receiving position in which the belt-tensioner plate is withdrawn from the belt-receiver cavity to allow movement of the portions of the vehicle seat belt into and out of the belt-receiver cavity, a juvenile seat configured to seat a child, and a slidable seat mount, including a movable seat platform and a releasable platform-motion blocker, the movable seat platform being coupled to the belt-tensioner plate to move up and down along a path provided on the belt-tensioner plate and coupled to the juvenile seat to support the juvenile seat for movement relative to the seat-mount frame, the releasable platform-motion blocker being configured to provide means for controlling movement of the movable seat platform relative to the belt-tensioner plate to establish a desired position and orientation of juvenile seat 14 on the movable seat platform relative to the foundation.

8. A child restraint comprising a seat-mount frame adapted to set on a passenger seat in a vehicle, a juvenile seat configured to seat a child, and a slidable seat mount coupled to the juvenile seat and arranged to slide on an outwardly facing exterior surface of the seat-mount frame under the control of a caregiver to change the position and orientation of the juvenile seat relative to the seat-mount frame wherein the underside of the juvenile seat is arranged to lie in confronting face-to-face relation to an entire topside of the slidable seat mount, and wherein the slidable seat mount includes a movable seat platform that is arranged to slide up and down along a curved path on an exterior surface which provides a bottom wall of a mount-receiving cavity formed in the seat-mount frame from a raised-and-retracted position to support the juvenile seat in a first orientation relative to the seat-mount frame to a lowered-and-extended position to support the juvenile seat in a different orientation relative to the seat-mount frame and a releasable platform-motion blocker that is coupled to the movable seat platform to slide with the movable seat platform relative to the seat-mount frame and configured to releasably engage the seat-mount frame to retain the movable seat platform in a position and orientation on the seat-mount frame selected by a caregiver.

9. A child restraint comprising a seat-mount frame adapted to set on a passenger seat in a vehicle, the seat-mount frame being formed to include an upwardly opening mount-receiving cavity, a slidable seat mount arranged to extend into the upwardly opening mount-receiving cavity and to slide up and down therein, and a juvenile seat configured to seat a child and formed to include a topside that is sized and shaped to receive a child and an opposite underside that faces toward an exposed elongated plate that is included in the slidable seat mount and is arranged to lie outside of the upwardly opening mount-receiving cavity formed in the seat-mount frame during movement of the slidable seat mount in the upwardly opening mount-receiving cavity between the raised-and-retracted position in which the juvenile seat is supported in a first orientation relative to the seat-mount frame and a lowered-and-extended position in which the juvenile seat is supported in a different orientation relative to the seat-mount frame to change the position and orientation of the juvenile seat that is mounted on the slidable seat mount.

\* \* \* \* \*